United States Patent
Kim

(10) Patent No.: US 9,610,662 B2
(45) Date of Patent: Apr. 4, 2017

(54) APPARATUS FOR ASSEMBLING OVERHEAD CAMSHAFT

(71) Applicant: HYUNDAI MOTOR COMPANY, Seoul (KR)

(72) Inventor: Hyoung Hyoun Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 7 days.

(21) Appl. No.: 14/557,017

(22) Filed: Dec. 1, 2014

(65) Prior Publication Data

US 2015/0174713 A1    Jun. 25, 2015

(30) Foreign Application Priority Data

Dec. 20, 2013 (KR) .................. 10-2013-0160728

(51) Int. Cl.
    *B23P 19/04* (2006.01)
    *B25B 11/02* (2006.01)
    *F01L 1/047* (2006.01)

(52) U.S. Cl.
    CPC ............ *B23P 19/042* (2013.01); *B25B 11/02* (2013.01); *F01L 1/047* (2013.01); *B23P 2700/02* (2013.01); *F01L 2001/0473* (2013.01); *F01L 2103/00* (2013.01); *F01L 2103/01* (2013.01); *Y10T 29/53978* (2015.01)

(58) Field of Classification Search
    CPC .................. F01L 2001/0535; B23P 19/042
    USPC ...................... 29/888.1; 123/90.27
    See application file for complete search history.

(56) References Cited

U.S. PATENT DOCUMENTS

| | | | | |
|---|---|---|---|---|
| 4,835,832 A * | 6/1989 | Arnold | ............... | F01L 1/047 29/445 |
| 5,041,253 A * | 8/1991 | Husted | ............... | B29C 37/0082 164/112 |
| 5,065,507 A * | 11/1991 | Wakamori | ........... | B07C 5/3412 29/407.04 |
| 5,664,463 A * | 9/1997 | Amborn | ............... | B21D 53/845 123/90.6 |
| 6,192,582 B1 * | 2/2001 | Swars | ................. | B21D 53/845 29/888.1 |

(Continued)

FOREIGN PATENT DOCUMENTS

| | | |
|---|---|---|
| JP | 06-328186 A | 11/1994 |
| JP | 3438222 B2 | 8/2003 |
| KR | 10-0961709 B1 | 6/2010 |

*Primary Examiner* — Larry E Waggle, Jr.
*Assistant Examiner* — Henry Hong
(74) *Attorney, Agent, or Firm* — McDermott Will & Emery LLP

(57) ABSTRACT

An apparatus for assembling an overhead camshaft that comprises a hollow outer shaft having at least one slot formed, an inner shaft having at least one pin hole formed, at least one first cam lobe, and at least one second cam lobe. The apparatus comprises a first fixture having two journals, on which the outer shaft is disposed, formed at opposite ends thereof. A second fixture has a plurality of journals on which at least two of the at least one first cam lobe and the at least one second cam lobe are disposed. A third fixture restricts upward and downward and rotational movements of at least one of the outer shaft, the at least one first cam lobe, and the at least one second cam lobe.

6 Claims, 11 Drawing Sheets

(56) References Cited

U.S. PATENT DOCUMENTS

| | | | | |
|---|---|---|---|---|
| 6,907,660 B2* | 6/2005 | Astner | F01L 1/047 | 123/90.27 |
| 7,069,892 B2* | 7/2006 | Lechner | F01L 1/047 | 123/90.27 |
| 7,610,890 B2* | 11/2009 | Lettmann | F01L 1/047 | 123/90.44 |
| 8,056,521 B2* | 11/2011 | Kreisig | F01L 1/047 | 123/193.3 |
| 8,096,275 B2* | 1/2012 | Marriott | F01L 1/053 | 123/90.31 |
| 8,459,220 B2* | 6/2013 | Comello | F01L 1/047 | 123/90.15 |
| 2002/0185094 A1* | 12/2002 | Yoon | F01L 1/053 | 123/90.38 |
| 2009/0223049 A1* | 9/2009 | Binder | B24B 19/12 | 29/888.1 |
| 2009/0229550 A1* | 9/2009 | Clever | B24B 19/12 | 123/90.17 |
| 2009/0229551 A1* | 9/2009 | Clever | F01L 1/022 | 123/90.17 |
| 2010/0170458 A1* | 7/2010 | Pluta | F01L 1/047 | 123/90.1 |
| 2012/0073533 A1* | 3/2012 | Hamada | F01L 1/053 | 123/90.27 |
| 2014/0174248 A1* | 6/2014 | Paul | B21D 53/845 | 74/567 |
| 2014/0190435 A1* | 7/2014 | Wigsten | F01L 1/3442 | 123/90.17 |
| 2014/0338618 A1* | 11/2014 | Kandolf | F01L 1/3442 | 123/90.15 |
| 2015/0075457 A1* | 3/2015 | Menonna | F01L 1/047 | 123/90.6 |

* cited by examiner

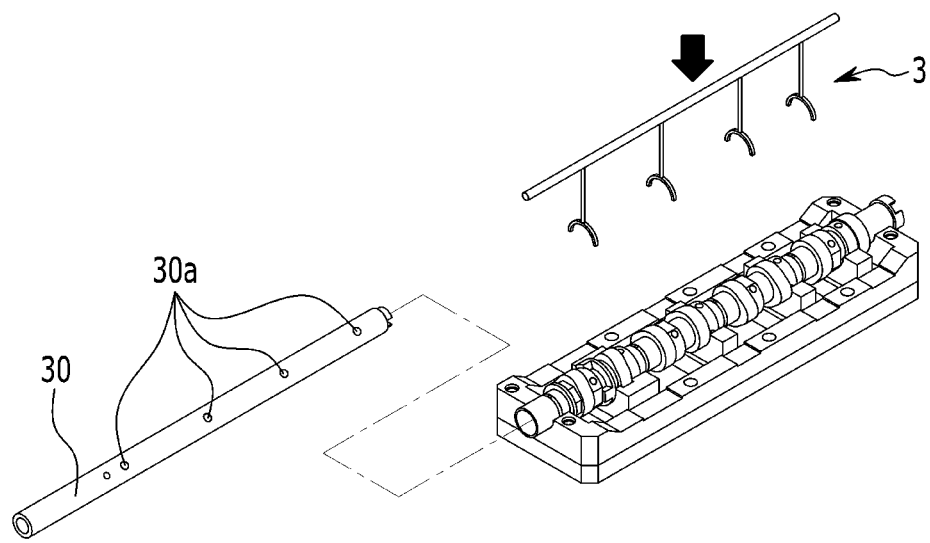
Fig. 5 (a)
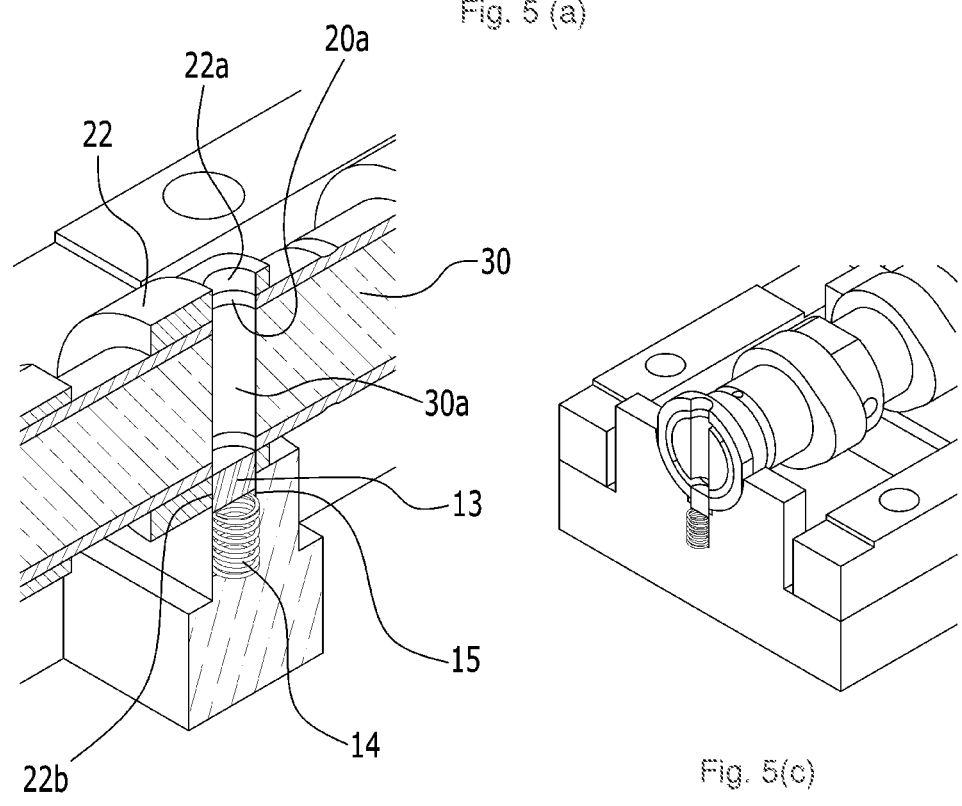
Fig. 5(b)
Fig. 5(c)

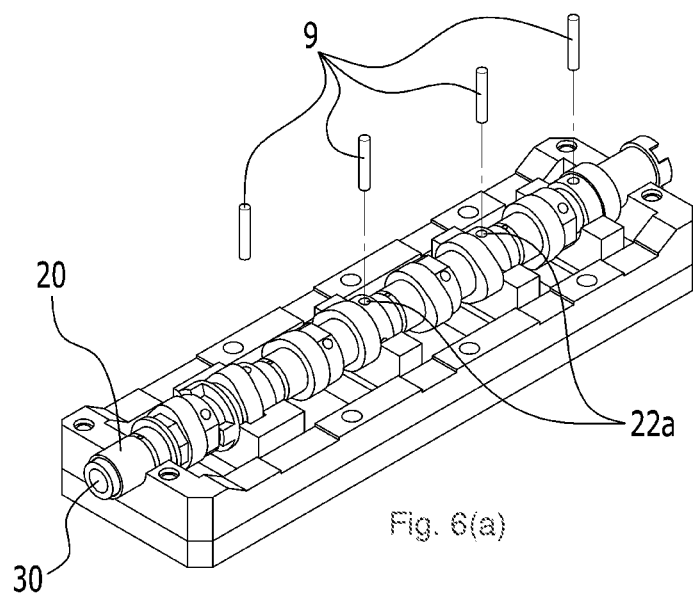
Fig. 6(a)
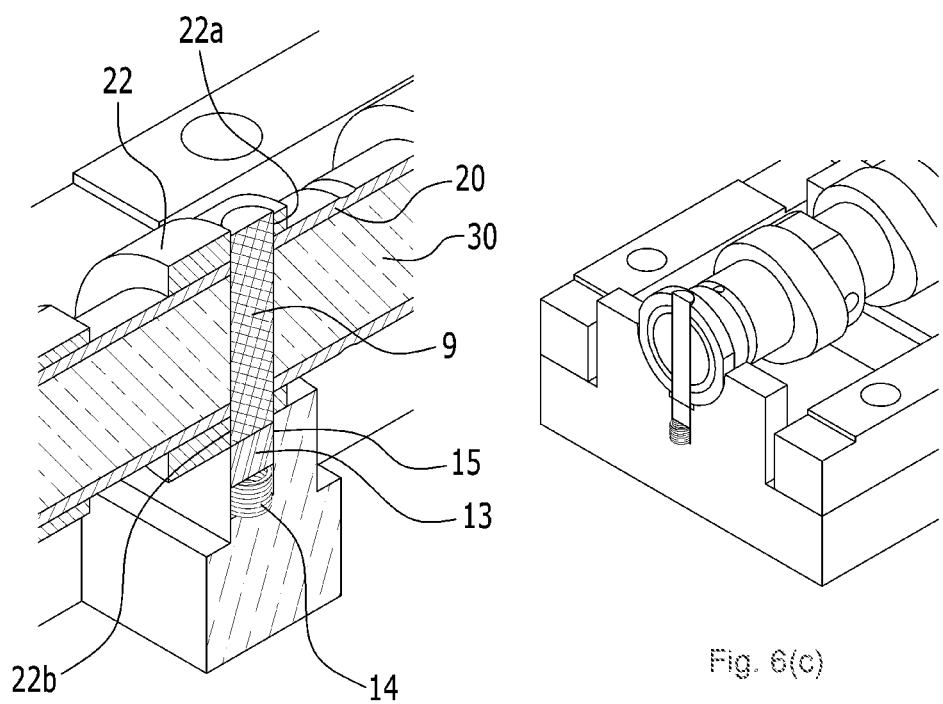
Fig. 6(b)
Fig. 6(c)

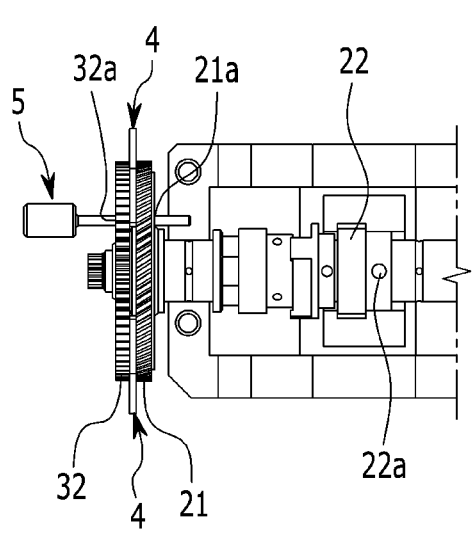
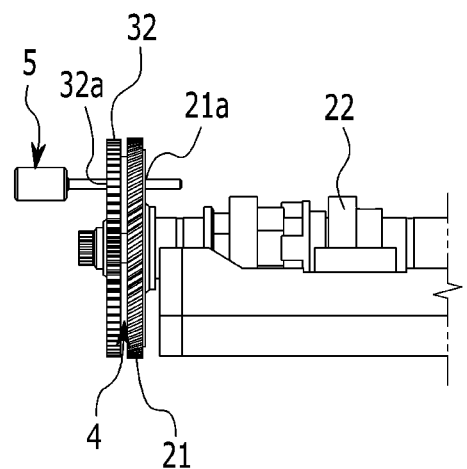
Fig. 11(a)  Fig. 11(b)
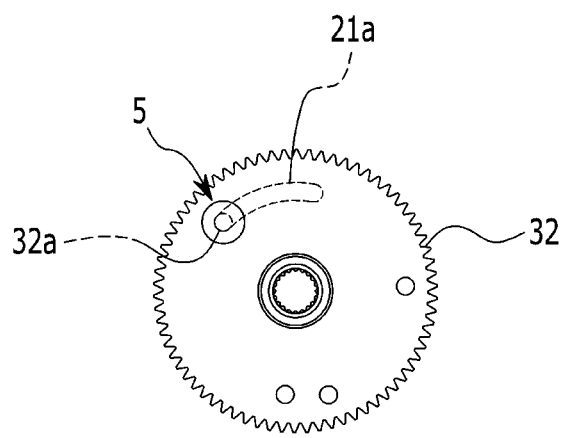
Fig. 11(c)

APPARATUS FOR ASSEMBLING OVERHEAD CAMSHAFT

CROSS-REFERENCE TO RELATED APPLICATION

The present application claims the benefit of priority to Korean Patent Application Number 10-2013-0160728 filed on Dec. 20, 2013, the entire contents of which application are incorporated herein for all purposes by this reference.

TECHNICAL FIELD

The present disclosure relates to an apparatus, and more particularly, to an apparatus for assembling an overhead camshaft.

BACKGROUND

An internal combustion engine generates power by burning a mixture of fuel and air in a combustion chamber. An intake valve is opened by a camshaft for the air or the mixture to enter the combustion chamber. An exhaust valve is opened by the camshaft after combustion to discharge for exhaust gas from the combustion chamber.

Operation of the intake valve and the exhaust valve is adjusted depending on an engine rotational speed (RPM) since adequate valve lift or opening/closing timing of the valves varies depending on the engine RPM.

A method of varying the opening/closing timing of the intake valve or the exhaust valve in accordance with a low speed or high engine RPM in order to supplement drawbacks of the general engine is called a variable valve timing (VVT) method.

An overhead camshaft, which is a hollow camshaft, comprises an outer shaft and an inner shaft rotatably inserted therein.

There are two kinds of cam lobes in the overhead camshaft; one kind of which are first cam lobes fixedly installed on the outer shaft, and the other kind of which are second cam lobes fixed to the inner shaft and rotatable on the outer shaft.

The overhead camshaft comprises two types of valve connected thereto; a first type of valve moves invariably in line with engine timing without special control, and movement of a second type of valve is controlled according to a phase of the valve to differentiate from the first type of valve.

A control apparatus varying a phase between a first cam lobe and a second cam lobe is called a cam phaser.

By using the overhead camshaft and the cam phaser, continuous variable valve timing (CVVT) method can be realized.

Positions of holes and slots must be accurately adjusted and fixed to obtain a coaxial structure between the outer shaft and the inner shaft for the overhead camshaft to be accurately controlled. Since the second cam lobe is fixed to the inner shaft by a pin for fixing the second cam lobe to the inner shaft, the pin is inserted through a fixing hole formed on one side of the second cam lobe, and a slot formed on one side of the outer shaft. A pin hole is formed through the inner shaft in order, continuing through an axis of rotation of the inner shaft and another slot on the opposite side of the outer shaft to another fixing hole on the opposite side of the second cam lobe.

Thus, an adequate apparatus in an assembly process is necessary to secure the mass production technology.

The above information disclosed in this Background section is only for enhancement of understanding of the background of the disclosure, and therefore, it may contain information that does not form the prior art that is already known in this country to a person of ordinary skill in the art.

SUMMARY

An aspect of the present inventive concept provides an effective apparatus for assembling an overhead camshaft in order to secure mass-productivity of the overhead camshaft assembly.

In various aspects of the present inventive concept, an apparatus for assembling an overhead camshaft that comprises: a hollow outer shaft having at least one slot formed along a length direction thereof; an inner shaft rotatably inserted inside the outer shaft and having at least one pin hole formed therethrough, each of the at least one pin hole disposed to correspond to that of each of the at least one slot; at least one first cam lobe fixedly mounted on an exterior circumference of the outer shaft; and at least one second cam lobe fixedly mounted on the inner shaft to be rotatable on the at least one slot of the outer shaft. The apparatus may comprise a first fixture having two journals formed at opposite ends in a length direction thereof, on which the outer shaft is disposed. A second fixture has a plurality of journals on which at least two of the at least one first cam lobe and the at least one second cam lobe are disposed. A third fixture restricts an upward and downward movement and a rotational movement of at least one of the outer shaft, the at least one first cam lobe, and the at least one second cam lobe placed on the journals of the first fixture and the second fixture, after the first fixture and the second fixture are combined.

The apparatus may further comprise a fourth fixture for determining an insert depth of the inner shaft into the outer shaft. A fifth fixture adjusts a phase between the inner shaft and the outer shaft. A sixth fixture restricts movements of the inner shaft and the outer shaft after the phase is adjusted.

Each of the at least one second cam lobe may have a fixing hole formed thereon, which corresponds to each of the at least one pin hole. Each of the journals on which the at least one second cam lobe is disposed may have a placing hole corresponding to the fixing hole. Each of the journals on which the at least one second cam lobe is disposed, may include a sliding pin mounted in the placing hole and a spring exerting an elastic force on the sliding pin.

One end of the outer shaft may be coupled with a first gear and one end of the inner shaft may be coupled with a second gear. A first phase-adjusting hole may be formed on the first gear, and a second phase-adjusting hole may be formed on the second gear. The fifth fixture may adjust the phase between the outer shaft and the inner shaft as the fifth fixture is inserted into both the first phase-adjusting hole and the second phase-adjusting hole and moves along the first phase-adjusting hole.

BRIEF DESCRIPTION OF THE DRAWINGS

FIGS. 5(a)-5(c) show a schematic perspective view of a third fixture of the apparatus according to the exemplary embodiment of the present inventive concept and two perspective views showing cross-sections of a condition in which an inner shaft has been inserted inside an outer shaft.

FIGS. 6(a)-6(c) show perspective views of an insertion process of a fixing pin using the apparatus according to the exemplary embodiment of the present inventive concept and an inserted condition of the fixing pin.

FIGS. 11(a)-11(c) include a plan view, a side view, and a front view of the apparatus according to the exemplary embodiment of the present inventive concept to show a role and a function of the fourth fixture and the fifth fixture.

DETAILED DESCRIPTION

Hereinafter, an exemplary embodiment of the present inventive concept will be described in detail with reference to the accompanying drawings so that those skilled in the technical field to which the present disclosure pertains may easily carry out the present disclosure.

The exemplary embodiment is an exemplary embodiment according to the present inventive concept, and since the present inventive concept may be implemented in various different ways by those skilled in the technical field to which the present inventive concept pertains, the scope of the present inventive concept is not limited to the exemplary embodiment that will be described below.

Throughout the specification and the claims, unless explicitly described to the contrary, the word "comprise" and variations such as "comprises" or "comprising" will be understood to imply the inclusion of stated elements but not the exclusion of any other elements.

In addition, the terms of constituent elements do not limit corresponding functions of the constituent elements.

Figure 1:
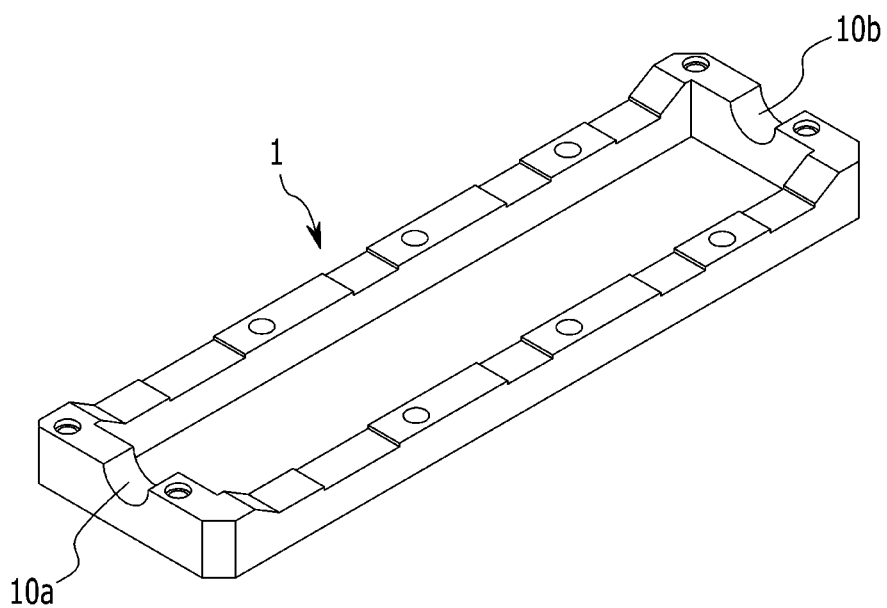
FIG. 1 is a perspective view of a first fixture of an apparatus for assembling an overhead camshaft according to an exemplary embodiment of the present inventive concept.
Figure 2:
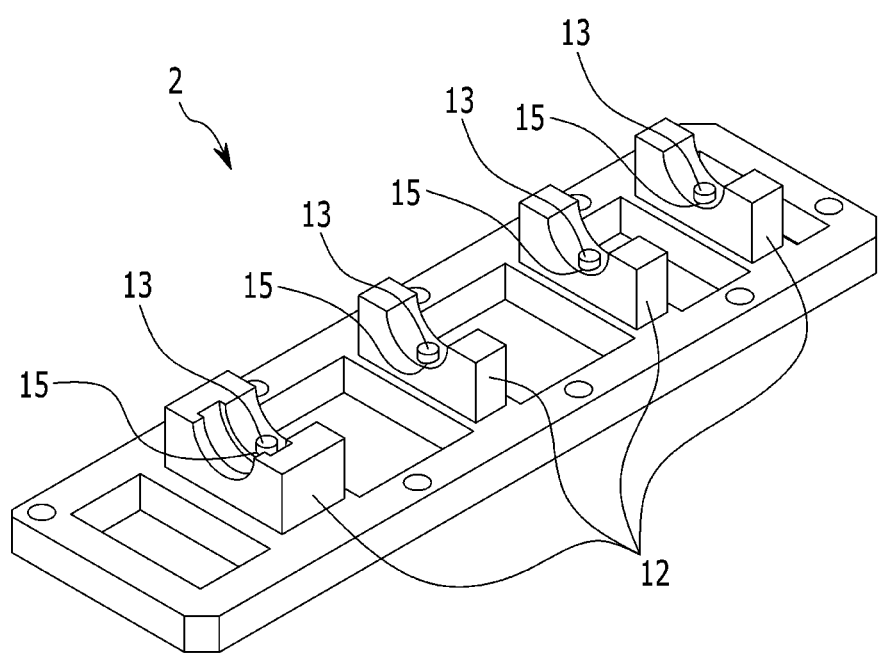
FIG. 2 is a perspective view of a second fixture of the apparatus according an exemplary embodiment of to the present inventive concept.
Figure 3:
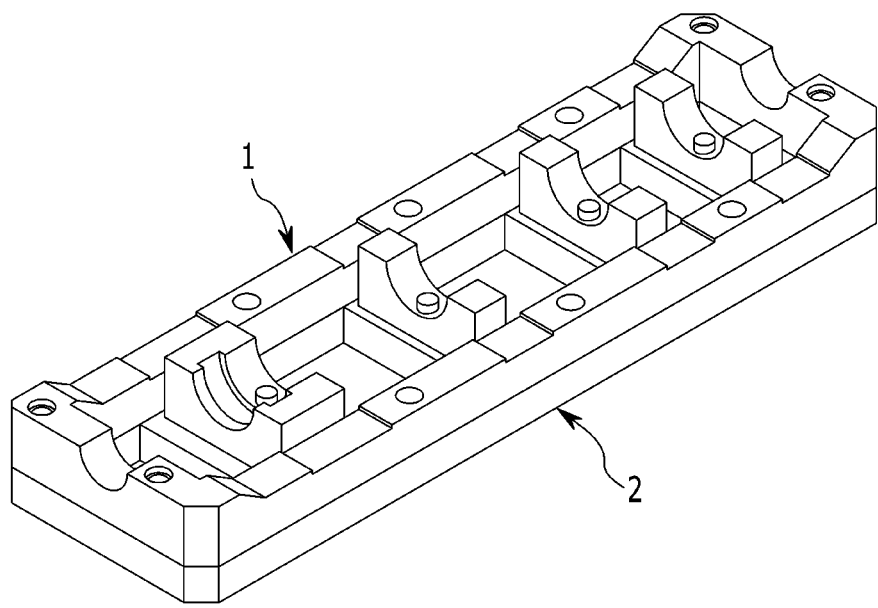
FIG. 3 is a combined perspective view of a first fixture and a second fixture of the apparatus according to an exemplary embodiment of the present inventive concept.
Figure 4A:
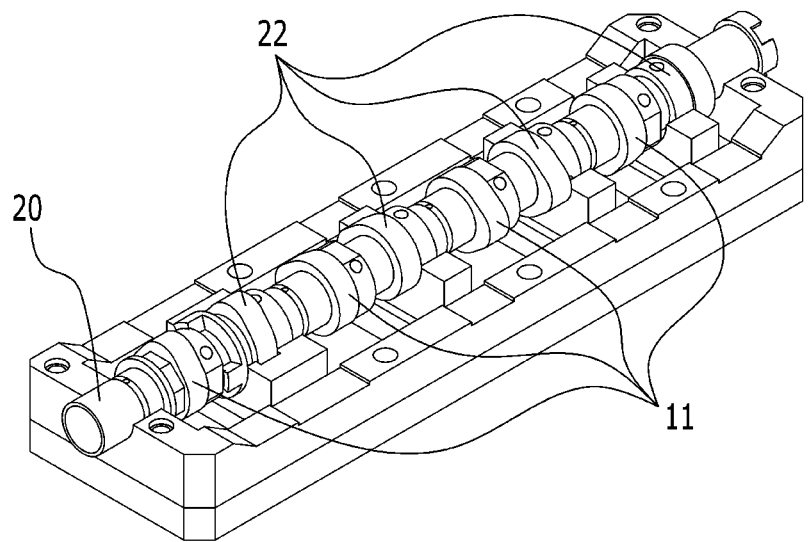
FIGS. 4(a) and 4(b) show a perspective view and a detailed cross-sectional view of an overhead camshaft placed on combined first and second fixtures of the apparatus according to an exemplary embodiment of the present inventive concept.
Figure 4B:
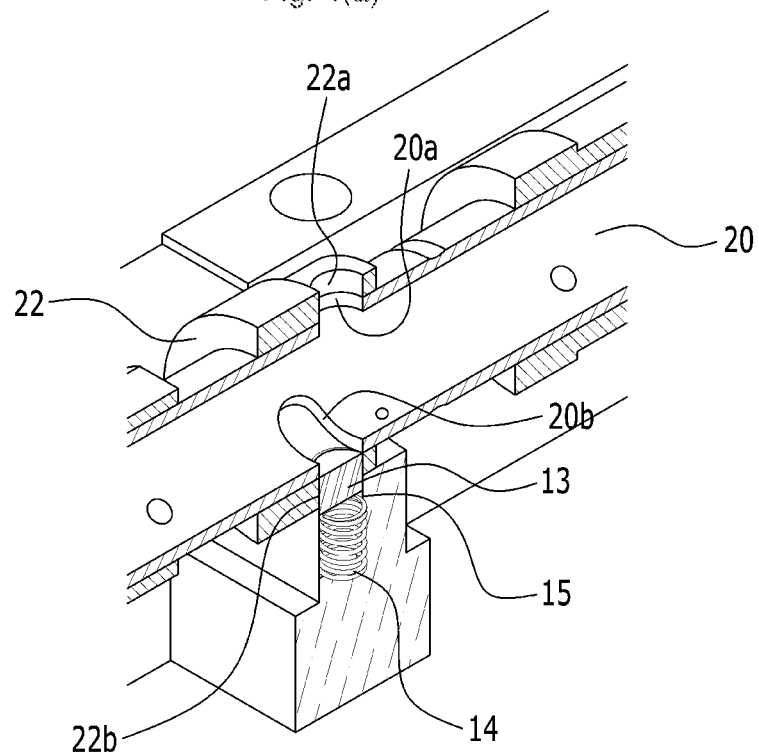

FIG. 1 is a perspective view of a first fixture of an apparatus for assembling an overhead camshaft according to an exemplary embodiment of the present inventive concept. FIG. 2 is a perspective view of a second fixture of the apparatus according to the present inventive concept. FIG. 3 is a combined perspective view of a first fixture and a second fixture of the apparatus according to the exemplary embodiment of the present inventive concept. FIGS. 4(a) and 4(b) show a perspective view and a detailed cross-sectional view of an overhead camshaft placed on the combined first fixture and second fixture of the apparatus according to an exemplary embodiment of the present inventive concept. FIGS. 5(a)-5(c) show a schematic perspective view of a third fixture of the apparatus according to the exemplary embodiment of the present inventive concept and two perspective views showing cross-sections of a condition in which an inner shaft has been inserted inside an outer shaft. FIGS. 6(a)-6(c) show perspective views of an insertion process of a fixing pin using the apparatus according to the exemplary embodiment of the present inventive concept and an inserted condition of the fixing pin.

Referring to FIG. 4(b), FIG. 5(b), and FIG. 6(b), an overhead camshaft according to the present disclosure may comprise a hollow outer shaft 20 having at least one slot 20a, 20b formed along a length direction thereof. An inner shaft 30 is rotatably inserted in the outer shaft 20 and has at least one pin hole 30a formed therethrough. A position of each of the at least one pin hole 30a corresponds to that of each of the at least one slot 20a, 20b. At least one first cam lobe 11 is fixedly mounted on an exterior circumference of the outer shaft 20. At least one second cam lobe 22 is fixedly mounted on the inner shaft 30 to be rotatable on the at least one slot 20a, 20b of the outer shaft 20. In this case, the at least one second cam lobe 22 may be fixed to the inner shaft 30 by a fixing pin 9.

The apparatus for assembling the overhead camshaft according to the present inventive concept may comprise at least one of a first fixture 1, a second fixture 2, a third fixture 3, a fourth fixture 4, a fifth fixture 5, and a sixth fixture 6.

Referring to FIG. 1, the first fixture 1 may have two journals 10a and 10b formed or mounted at opposite ends in a length direction thereof such that the outer shaft 20 can be placed on the two journals 10a and 10b.

Referring to FIG. 2, the second fixture 2 may have a plurality of journals 12 formed or mounted such that the plurality of journals 12 can place at least two of the at least one first cam lobe 11 and the at least one second cam lobe 22 thereon.

Each of the journals 12 on which the at least one second cam lobe 22 is placed, among the plurality of journals 12, may include a sliding pin 13 and a placing hole 15.

The sliding pin 13 fixes the second cam lobe 22 to a predetermined position and is fitted into the placing hole 15 formed in the journal 12 correspondingly to fixing holes 22a and 22b of the second cam lobe 22.

The sliding pin 13 and the placing hole 15 effectively fix the second cam lobe 22 on the inner shaft 30 when the fixing pin 9 is inserted through the fixing hole 22a of the second cam lobe 22, the slot 20a of the outer shaft 20, and the pin hole 30a of the inner shaft 30 from a rotational axis of the inner shaft 30 and the slot 20b to the fixing hole 22b in order.

In FIG. 2, four journals 12 on the second fixture 2 are shown for placing four second cam lobes 22 thereon as an exemplary embodiment of the present inventive concept.

The first fixture 1 and the second fixture 2 have relative shapes with each other such that the overhead camshaft according to an exemplary embodiment of the present inventive concept can be positioned precisely.

In addition, the journals 10a and 10b of the first fixture 1 and the journals 12 of the second fixture 2 are formed such that concentric circles of the cam lobes 11, 12 and the shafts 20, 30 can be precisely placed.

In FIG. 3, the four journals 12 for placing the four second cam lobes 22 on the second fixture 2 are shown as an exemplary embodiment of the present inventive concept. In case a plurality of first cam lobes 11 are additionally placed, and all the first cam lobes 11 and the second cam lobes 22 are inserted on the outer shaft 20, the number of the journals 12 may be increased as many as the number of the first cam lobes 11 are added.

The sliding pin 13 and the placing hole 15 may not be formed in each of the journals 12 corresponding to the first cam lobes 11.

Referring to FIG. 4(b), the placing hole 15 can be fitted with the sliding pin 13 and a spring 14 for providing the sliding pin 13 with elastic force.

The sliding pin 13 causes the second cam lobe 22 to be fixed to a precise position on the journal 12 by being coupled to the fixing hole 22b formed in a lower portion of the second cam lobe 22. The second cam lobe 22 is fixed, by the sliding pin 13, at a position in which the fixing pin 9 penetrates through in order of the fixing hole 22a, the upper slot 20a of the outer shaft 20, the lower slot 20b of the outer shaft 20, and the fixing hole 22b.

Then, each of the holes may line up by adjusting a phase of the outer shaft 20 or the inner shaft 30.

Referring to FIG. 5(a), the inner shaft 30 may be inserted after the first cam lobes 11 and the second cam lobes 22 are mounted on the outer shaft 20.

Here, the third fixture 3 restricts a an up and down movement and a rotational movement of at least one of the outer shaft 20, at least one first cam lobe 11, and at least one second cam lobe 22 placed on journals of the first fixture 1 and the second fixture 2. This is because when the fixing pin 9 is inserted through, the holes of the outer shaft 20 and the inner shaft 30 corresponding to one another must be lined up and precisely fixed by the fixing pin 9.

In FIG. 5(a), an exemplary embodiment is schematically shown, in which the third fixture 3 restricts the up and down movement and the rotational movement of the second cam lobes 22 by pressurizing from an upper portion to a lower portion by a hydraulic equipment with the fixing holes 22a of the second cam lobes 22.

Here, the inner shaft 30 can be inserted inside the outer shaft 20, and thereafter, a coupling process, by the fixing pin 9, of the second cam lobes 22 and the inner shaft 30 may be accomplished.

FIG. 5(b) is a cross-sectional view in which the inner shaft 30 is inserted inside the outer shaft 20.

As in FIG. 4(b), the sliding pin 13 allows the second cam lobe 22 to be disposed in a precise position by being coupled to the fixing hole 22b formed in a lower portion of the second cam lobe 22. In this state, angular positions of the slot 20a and 20b of the outer shaft 20 and the fixing hole 22a and 22b are determined.

By adjusting an insert depth and a phase of the inner shaft 30 with respect to the outer shaft 20, the pin hole 30a of the inner shaft 30 can be lined up with the slot 20a and 20b and the fixing hole 22a and 22b of which the angular positions have been determined.

FIG. 5(c) is a cross-sectional view with respect to a length direction of the shafts.

Here, the phase of the inner shaft 30 has been adjusted to be lined up with the angular positions of the fixing hole 22a and 22b and the slot 20a and 20b determined by the sliding pin 13.

FIG. 6(a) shows a process in which the second cam lobes 22 and the inner shaft 30 are fixedly coupled by the fixing pins 9 which are inserted sequentially through the upper fixing holes 22a of the second cam lobes 22, the upper slots 20a of the outer shaft 20, the pin holes 30a of the inner shaft 30, the lower slots 20b of the outer shaft 20, and the lower fixing holes 22b of the second cam lobes 22.

In this case, even though the third fixture 3 was omitted in FIG. 6(a), the inserting process of the fixing pins 9 may be achieved by displacing in the up and down direction and rotational displacing the second cam lobes 22 as in FIG. 5(a).

FIG. 6(b) shows a state in which the fixing pin 9 is inserted through the adjusted holes of the second cam lobe 22, the outer shaft 20, and the inner shaft 30.

At this moment, the sliding pin 13 is pushed away from the fixing hole 22b by inserting the fixing pin 9 and is fixed inside the placing hole 15. In addition, the spring 14 is compressed.

In FIG. 6(c), the above mentioned state can be also shown.

Figure 7:
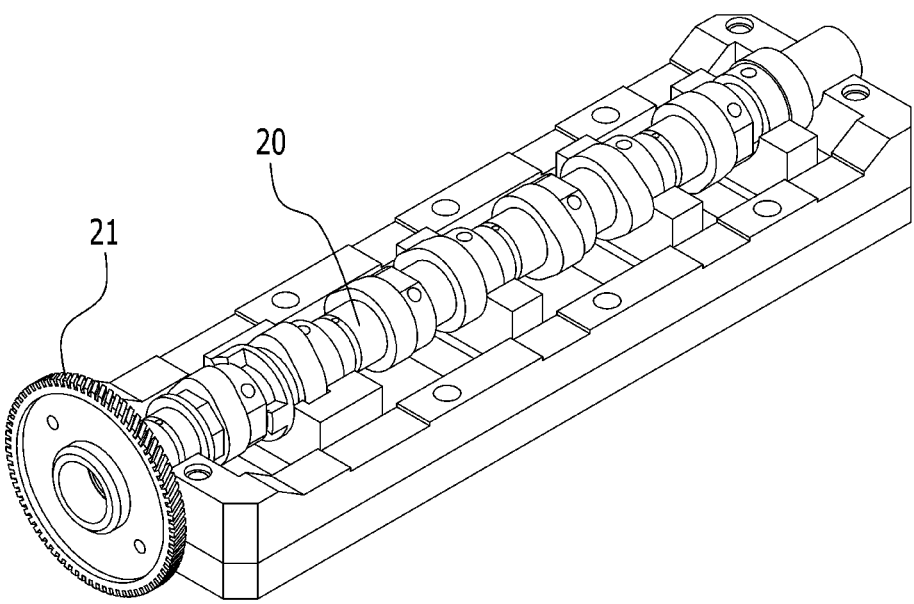
FIG. 7 is a perspective view showing an outer shaft fitted with a first gear, which is placed on the apparatus according to the exemplary embodiment of the present inventive concept.

FIG. 7 is a perspective view showing an outer shaft fitted with a first gear, which is placed on the apparatus according to an exemplary embodiment of the present inventive concept.

Referring to FIG. 7, one end of the outer shaft 20 may be fitted with a first gear 21.

The inner shaft 30 of which one end is fitted with a second gear 32 (See FIG. 9) may be inserted inside the outer shaft 20 with the first gear 21 fitted therewith. Therefore, in this case, an additional fixture may be required for accurately adjusting insert depth of the outer shaft 20 and the inner shaft 30.

Figure 8:
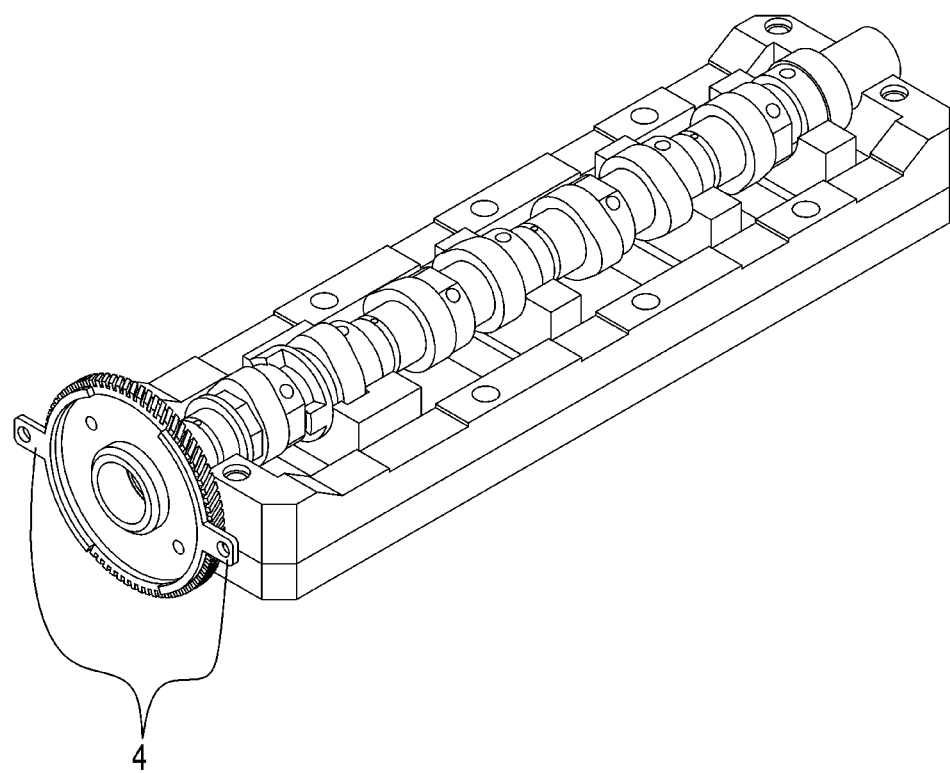
FIG. 8 is a perspective view of a fourth fixture of the apparatus according the exemplary embodiment of to the present inventive concept.

FIG. 8 is a perspective view of a fourth fixture of an apparatus for assembling an overhead camshaft according to an exemplary embodiment of the present inventive concept.

The fourth fixture 4 is formed such that an insert depth of the inner shaft 30 into the outer shaft 20 is determined.

The fourth fixture 4 may be mounted at the first gear 21 of the outer shaft 20 and may be formed to regulate a gap between the outer shaft 20 and the inner shaft 30.

In other words, the fourth fixture 4 may be formed such that the inner shaft 30 becomes located in a precise position required for insertion of the fixing pins 9 when the second gear 32 mounted on one end of the inner shaft 30 makes a face-to-face contact with the fourth fixture 4 mounted at the first gear 21.

Figure 9:
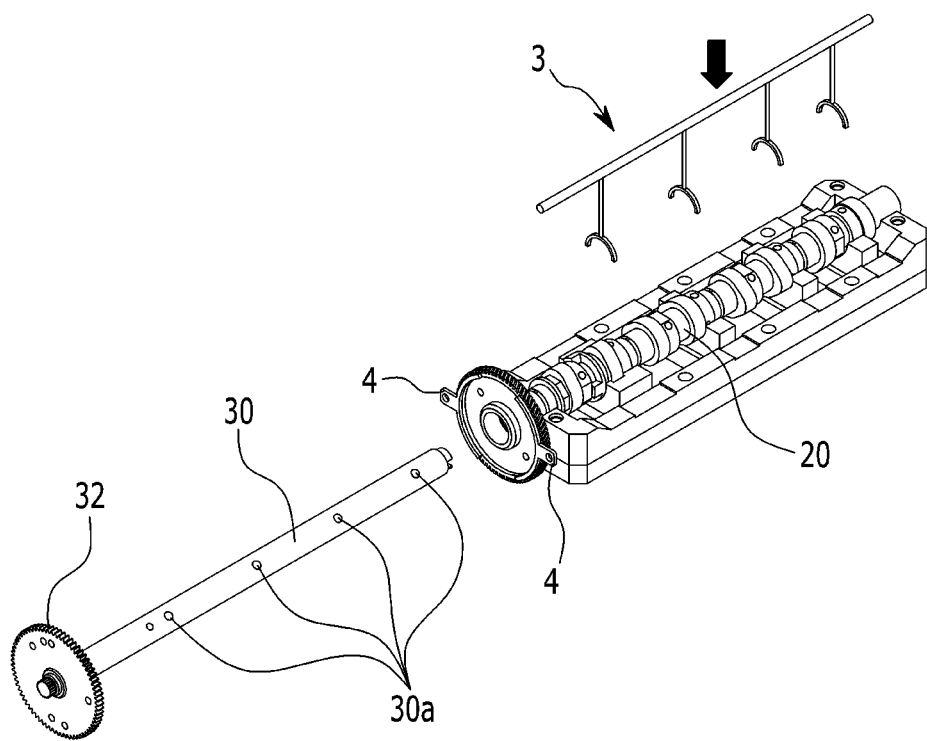
FIG. 9 is a perspective view showing a first, a second, a third, and a fourth fixture of the apparatus according the exemplary embodiment of to the present inventive concept.

FIG. 9 is a perspective view showing a first, a second, a third, and a fourth fixture of an apparatus for assembling an overhead camshaft according to an exemplary embodiment of the present inventive concept.

Using the first fixture 1 and the second fixture 2, a position of the outer shaft 20 in a length direction thereof, and positions of the first cam lobes 11 and the second cam lobes 22 in the length direction of the outer shaft 20 are determined.

In addition, angular positions of the second cam lobes 22 are also determined by the placing holes 15 formed on journals 12 of the second fixture 2 and the sliding pins 13 and the springs 14 mounted in the placing holes 15.

Movement in an up and down direction and rotational movement of the outer shaft 20 or the second cam lobes 22 are restricted by the third fixture 3.

When the fourth fixture 4 is used, the insert depth of the inner shaft 30 fitted with the second gear 32 into the outer shaft 20 fitted with the first gear 21 is determined. A fixture accurately adjusting phase of the inner shaft 30 may be required in order to line up the pin holes 30a of the inner shaft 30 with the fixing holes 22a and 22b of the second cam lobes 22 and the slots 20a and 20b of the outer shaft 20.

Figure 10:
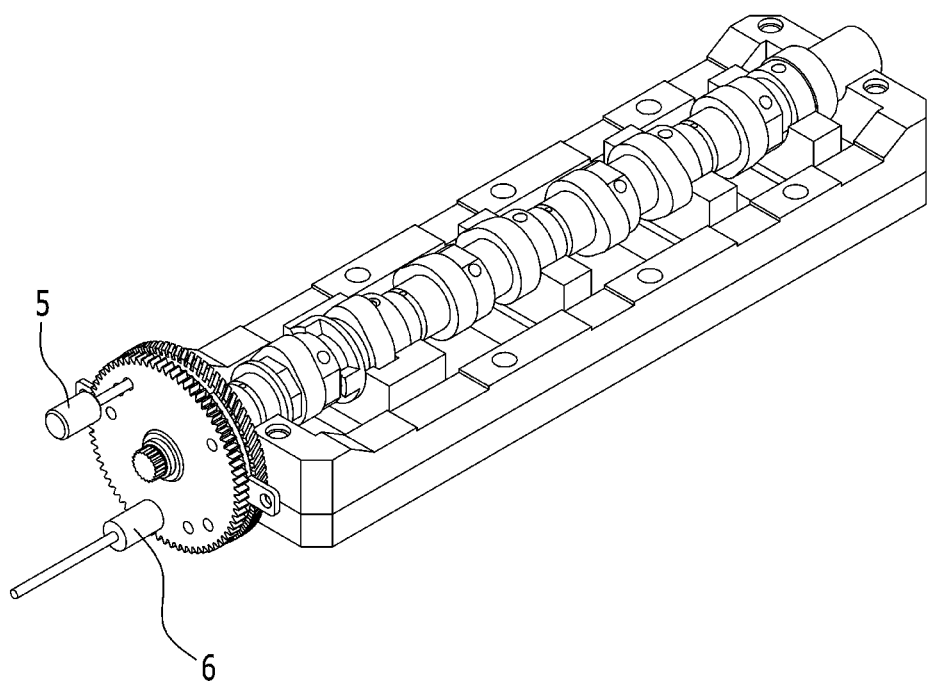
FIG. 10 is a perspective view showing a fifth and a sixth fixture of the apparatus according to the exemplary embodiment of the present inventive concept.

FIG. 10 is a perspective view showing a fifth and a sixth fixture of the apparatus for assembling an overhead camshaft according to an exemplary embodiment of the present inventive concept.

FIG. 10 shows a fifth fixture 5. The fifth fixture 5 is a fixture formed to adjust phases between the inner shaft 30 and the outer shaft 20. The fifth fixture 5 may be a lever formed to pass through a second phase-adjusting hole 32a formed in a second gear 32 mounted at one end of the inner shaft 30 and a first phase-adjusting hole 21a formed in a first gear 21 mounted at one end of the outer shaft 20.

FIG. 10 also shows a sixth fixture 6. The sixth fixture 6 is formed to restrict movements of the inner shaft 30 and the outer shaft 20 of which phases are lined up with each other. The sixth fixture 6 may be a kind of pushrod and may fix the insert depth of the shafts, 20 and 30, and the adjusted phase by clamping the second gear 32 through pressurizing a surface of the second gear 32.

FIG. 11 includes a plan view, a side view, and a front view of a jig apparatus according to an exemplary embodiment of the present inventive concept to show a role and a function of a fourth fixture and a fifth fixture.

FIG. 11(a) is a top plan view showing a state in which the insert depth of the inner shaft 30 is determined and a phase between the inner shaft 30, and the outer shaft 20 is adjusted by a fourth fixture 4 and a fifth fixture 5.

The insert depth is determined by a gap between the second gear 32 and the first gear 21 which is regulated through a thickness of the fourth fixture 4.

The fifth fixture 5 is inserted through the second phase-adjusting hole 32a to the first phase-adjusting hole 21a.

The first phase-adjusting hole 21a has a kind of slot shape and allows the fifth fixture 5 to rotate as much as a preset rotation angle on the first phase-adjusting hole 21a.

FIG. 11(b) is a side view showing a state in which the insert depth of the inner shaft 30 is determined and phase between the inner shaft 30 and the outer shaft 20 is adjusted by the fourth fixture 4 and the fifth fixture 5. A gap between the first gear 21 and the second gear 32 is regulated by the thickness of the fourth fixture 4.

FIG. 11(c) is a front view showing a method to adjust phase by the fifth fixture 5.

The fifth fixture 5 is configured to be rotatable as much as a predetermined rotational angle on the first phase-adjusting hole 21a. Accordingly, after the insert depth is determined by the fourth fixture 4, the fifth fixture 5 is inserted into the second phase-adjusting hole 32a and is rotated adequately in order to be positioned such that the fifth fixture 5 can be inserted through the first phase-adjusting hole 21a.

When the fifth fixture 5 rotates from one end of the first phase-adjusting hole 21a to another end thereof along the first phase-adjusting hole 21a, a pin hole 30a of the inner shaft 30 may line up with an upper fixing hole 22a of the second cam lobe 22 and an upper slot 20a of the outer shaft 20 in order.

As explained in detail, according to the present disclosure, stability and accuracy become increased in an overhead camshaft assembly process. Therefore, mass productivity of overhead camshafts can be secured.

While this inventive concept has been described in connection with what is presently considered to be practical exemplary embodiments, it is to be understood that the inventive concept is not limited to the disclosed embodiments, but on the contrary, is intended to cover various modifications and equivalent arrangements included within the spirit and scope of the appended claims.

What is claimed is:

1. An apparatus for assembling an overhead camshaft that comprises:
a hollow outer shaft having at least one slot formed along a length direction thereof;
an inner shaft rotatably inserted inside the outer shaft and having at least one pin hole formed therethrough, each of the at least one pin hole disposed to be correspond to each of the at least one slot;
at least one first cam lobe fixedly mounted on an exterior circumference of the outer shaft; and
at least one second cam lobe fixed to the inner shaft to be rotatable on the at least one slot of the outer shaft,
the apparatus comprising:
a first fixture having two journals formed at opposite ends in a length direction thereof on which the outer shaft is disposed;
a second fixture having a plurality of journals on which at least two of the at least one first cam lobe and the at least one second cam lobe are disposed; and
a third fixture restricting upward and downward movement and rotational movement of at least one of the outer shaft, the at least one first cam lobe, and the at least one second cam lobe disposed on the journals of the first fixture and the second fixture, after the first fixture and the second fixture are combined;
wherein each of the at least one second cam lobe has a fixing hole formed thereon, the fixing hole corresponding to each of the at least one pin hole of the inner shaft,
wherein each of the journals of the second fixture on which the at least one second cam lobe is disposed, has a placing hole corresponding to the fixing hole, and
wherein each of the journals of the second fixture on which the at least one second cam lobe is disposed, includes a sliding pin mounted in the placing hole and a spring exerting an elastic force on the sliding pin.

2. The apparatus of claim 1, further comprising:
a fourth fixture for determining an insert depth of the inner shaft into the outer shaft;
a fifth fixture for adjusting a phase between the inner shaft and the outer shaft; and
a sixth fixture for restricting movements of the inner shaft and the outer shaft after the phase is adjusted.

3. The apparatus of claim 2,
wherein one end of the outer shaft is coupled with a first gear and one end of the inner shaft is coupled with a second gear, and
wherein the fourth fixture is mounted at the first gear and adjusts a gap between the outer shaft and the inner shaft.

4. The apparatus of claim 2,
wherein one end of the outer shaft is coupled with a first gear and one end of the inner shaft is coupled with a second gear,
wherein a first phase-adjusting hole is formed on the first gear and a second phase-adjusting hole is formed on the second gear, and
wherein the fifth fixture adjusts the phase between the outer shaft and the inner shaft as the fifth fixture is inserted into both the first phase-adjusting hole and the second phase-adjusting hole and moves along the first phase-adjusting hole.

5. The apparatus of claim 1, further comprising:
a fifth fixture for adjusting a phase between the inner shaft and the outer shaft; and
a sixth fixture for restricting movements of the inner shaft and the outer shaft after the phase is adjusted.

6. The apparatus of claim 5,
wherein one end of the outer shaft is coupled with a first gear and one end of the inner shaft is coupled with a second gear, wherein a first phase-adjusting hole is formed on the first gear and a second phase-adjusting hole is formed on the second gear, and wherein the fifth fixture adjusts the phase between the outer shaft and the inner shaft as the fifth fixture is inserted into both the first phase-adjusting hole and the second phase-adjusting hole and moves along the first phase-adjusting hole.

\* \* \* \* \*